US 11,502,475 B2

(12) United States Patent
Wen et al.

(10) Patent No.: US 11,502,475 B2
(45) Date of Patent: Nov. 15, 2022

(54) METHOD AND DEVICE FOR PROCESSING ACTIVE MICROCRYSTALLINE FIBER BY MAGNETIC FIELD INDUCTION AND LASERING

(71) Applicant: Shanghai University, Shanghai (CN)

(72) Inventors: Jianxiang Wen, Shanghai (CN); Zheng Liu, Shanghai (CN); Tingyun Wang, Shanghai (CN); Yanhua Dong, Shanghai (CN); Fufei Pang, Shanghai (CN); Ziwen Zhao, Shanghai (CN); Zhenyi Chen, Shanghai (CN)

(73) Assignee: Shanghai University, Shanghai (CN)

( * ) Notice: Subject to any disclaimer, the term of this patent is extended or adjusted under 35 U.S.C. 154(b) by 0 days.

(21) Appl. No.: 17/606,707

(22) PCT Filed: Apr. 2, 2020

(86) PCT No.: PCT/CN2020/082912
§ 371 (c)(1),
(2) Date: Oct. 26, 2021

(87) PCT Pub. No.: WO2020/220924
PCT Pub. Date: Nov. 5, 2020

(65) Prior Publication Data
US 2022/0149581 A1 May 12, 2022

(30) Foreign Application Priority Data
Apr. 30, 2019 (CN) .......................... 201910365060.6

(51) Int. Cl.
H01S 3/067 (2006.01)
C03B 37/027 (2006.01)
(Continued)

(52) U.S. Cl.
CPC ........ *H01S 3/06716* (2013.01); *C03B 37/027* (2013.01); *C03B 37/02727* (2013.01);
(Continued)

(58) Field of Classification Search
None
See application file for complete search history.

(56) References Cited

U.S. PATENT DOCUMENTS 4,917,455 A    4/1990   Soane
5,226,101 A *  7/1993   Szentesi ............... G02B 6/3818
                                            219/121.61
(Continued)

FOREIGN PATENT DOCUMENTS

CN    1379740 A    11/2002
CN    2938146 Y    8/2007
(Continued)

OTHER PUBLICATIONS

Huang et al., "Fabrication of Cr-doped Fibers by Drawing Tower", in Optical Fiber Communication Conference and Exposition and The National Fiber Optic Engineers Conference, Technical Digest (CD) (Optica Publishing Group, 2006), paper OWI21,3 pages. (Year: 2006).*

(Continued)

Primary Examiner — Lisa L Herring
(74) Attorney, Agent, or Firm — Dragon Sun Law Firm, PC; Jinggao Li; Nathaniel Perkins

(57) ABSTRACT

The invention discloses a preparation method and device of active microcrystalline fiber, place the prefabricated rod in the drawing furnace for wire drawing, the drawn fiber is induced by magnetic field in uncoated state and combined with laser treatment technology, the laser beam is focused on the fiber and recrystallized after laser treatment to obtain active microcrystalline fiber. Appropriate laser processing (Continued)

power directly affects the silicate glass fiber in the crystal structure, type, degree of crystallinity, grain size, content, and how much residual phase of glass. Induced by external magnetic field, the thermodynamics and dynamics of crystallization process are changed, make the crystal size distribution is better and uniform, reduce the phenomenon of condensation and makes the grain size is smaller.

10 Claims, 2 Drawing Sheets

(51) Int. Cl.
 *C03B 37/10* (2006.01)
 *H01S 3/16* (2006.01)
(52) U.S. Cl.
 CPC .............. *C03B 37/10* (2013.01); *H01S 3/161* (2013.01); *H01S 3/1605* (2013.01); *H01S 3/1608* (2013.01); *H01S 3/1611* (2013.01); *H01S 3/1616* (2013.01); *H01S 3/1618* (2013.01)

(56) References Cited

U.S. PATENT DOCUMENTS

| | | | | |
|---|---|---|---|---|
| 5,314,519 | A | * 5/1994 | Petisce | C03B 37/027 427/457 |
| 7,536,877 | B2 | 5/2009 | Hong et al. | |
| 2014/0300962 | A1 | 10/2014 | Hosokawa et al. | |

FOREIGN PATENT DOCUMENTS

| | | | | |
|---|---|---|---|---|
| CN | 102122019 | A | | 7/2011 |
| CN | 203621741 | U | | 6/2014 |
| CN | 105826805 | A | | 8/2016 |
| CN | 106082684 | A | | 11/2016 |
| CN | 106477874 | A | | 3/2017 |
| CN | 106950642 | A | | 7/2017 |
| CN | 108483899 | A | | 9/2018 |
| CN | 207933273 | U | | 10/2018 |
| CN | 108899752 | A | * 11/2018 | ......... H01S 3/06716 |
| CN | 108899752 | A | | 11/2018 |
| CN | 109669232 | A | | 4/2019 |
| CN | 112645584 | A | * 4/2021 | |
| JP | 2004203708 | A | * 7/2004 | ....... C03B 37/01815 |
| JP | 2008308361 | A | * 12/2008 | ....... C03B 37/02727 |

OTHER PUBLICATIONS

Dragic et al., "YAG-derived fiber for high-power narrow-linewidth fiber lasers", Proc. of SPIE vol. 8237, pp. 82371 E-1 to E-9, 2012. (Year: 2012).*

Zheng et al., "Preparation and characterizations of Yb:YAG-derived silica fibers drawn by on-line feeding molten core approach", Ceramics International 43 (2017) 5837-5841, Jan. 25, 2017. (Year: 2017).*

Gao, Ran, Synthesis and Application on Fiber Optic Sensor Based on Micromachining Fabrication, Beijing Institute of Technology, Jul. 15, 2015.

International Search Report of PCT/CN2020/082912, dated Jun. 18, 2020.

Written Opinion of PCT/CN2020/082912, dated Jun. 18, 2020.

* cited by examiner

METHOD AND DEVICE FOR PROCESSING ACTIVE MICROCRYSTALLINE FIBER BY MAGNETIC FIELD INDUCTION AND LASERING

CROSS-REFERENCE TO RELATED APPLICATIONS

This Application is a national stage application of PCT/CN2020/082912. This application claims priorities from PCT Application No. PCT/CN2020/082912, filed Apr. 2, 2020, and from the Chinese patent application 201910365060.6 filed Apr. 30, 2019, the content of which are incorporated herein in the entirety by reference.

TECHNICAL FIELD

The present invention relates to the technical field of special optical fiber, in particular, to a method and device for processing active microcrystalline fiber by magnetic field induction and lasering.

BACKGROUND ART

Rare earth ion doped fiber has abundant energy levels and unique electron configuration, which is widely used as gain medium of fiber laser and amplifier, crystals doped with rare earth ions are called active crystals. Ytterbium doped fiber due to the energy level structure with simple, and the width of the absorption and emission cross section, long fluorescence lifetime, the advantages of high quantum efficiency, which is the core of the fiber laser device, used for industrial processes, Ytterbium doped fiber due to the energy level structure with simple, and the width of the absorption and emission cross section, long fluorescence lifetime, the advantages of high quantum efficiency, which is the core of the fiber laser device, used for industrial processes. It is of great significance to promote the development of "intelligent manufacturing". Fiber laser was first put forward by Sniter, has aroused people's great attention, double cladding fiber is put forward, make the output power of fiber lasers is achieved from milliwatts magnitude to class, or even hundreds of watts; The mature technology of semiconductor laser has further improved the power output of fiber laser. However, with the continuous improvement of the output power of fiber laser, the thermal effect, nonlinear effect, photon darkening effect and mode instability seriously restrict the improvement of the output power of fiber laser. At present, ytterbium-doped quartz fiber is mainly based on gas phase and liquid phase doping technology of improved chemical vapor deposition method. The doping concentration is low, which has approached the limit of quartz matrix fiber, and restricts the further improvement of laser output power.

Microcrystalline fiber because of strong crystal field, low phonon energy, reduces the radiation relaxation transition probability, reducing the generation of heat. The transmission loss in the microcrystalline fiber is mainly due to the light scattering caused by the grain. When the grain size is less than ½₀ of the luminous wavelength, the scattering caused by the grain can be ignored. Research shows the ytterbium ions in yttrium aluminum garnet (YAG) crystals are characterized by high doping concentration, simple energy level structure, no excited state absorption and conversion, long fluorescence lifetime and absorption emission bandwidth, which make Yb:YAG crystals can be used as high concentration doped laser materials. However, Yb:YAG crystal has a fixed melting point and is not easy to be drawn into fiber, so the thermal effect is large.

In the published patent literature, the application number CN104609722A has proposed a preparation method of tube-melt co-pull bismuth doped fiber, it is not suitable for material preparation with high heat treatment temperature and has limitations. The application number CN102010123A proposes a heat treatment method and device for optical fiber, adopt heat preservation furnace to remove stress.

High-power fiber lasers are playing an increasingly important role in industrial processing, military defense, scientific research and other fields, so the preparation of a new type of active microcrystalline fiber material is becoming particularly important.

SUMMARY OF THE INVENTION

The present invention to solve the technical problem is: Aiming at the problem of high thermal effect of active crystal after drawing, a method and device for processing active microcrystalline fiber by magnetic field induction and lasering treatment are provided. The technical scheme of the invention is as follows: A method of preparation active microcrystalline fiber, which is the drawn fiber is introduced into a magnetic field and the fiber is irradiated by a laser.

The specific steps are: Place the prefabricated rod in the drawing furnace for wire drawing, the drawn fiber is induced by magnetic field in uncoated state and combined with laser treatment technology, the laser beam is focused on the fiber and recrystallized after laser treatment to obtain active microcrystalline fiber.

The magnetic field is a stable magnetic field, alternating magnetic field or pulsed magnetic field.

The strength of the magnetic field is 0-5 T.

The laser has a power of 0-5 W.

The laser beam spot is ring or circular, and the diameter of the spot is 0.1-5 mm.

An active microcrystalline fiber comprises a fiber core and a cladding layer, which is the fiber core is yttrium aluminum garnet, bismuth germanate, lead tungstate or sodium iodide. The crystal size is 2-100 nm, and the coating is quartz material.

The cores are singly or jointly doped with: ytterbium, neodymium, erbium, bismuth, thulium, holmium, cerium, terbium, and gadolinium.

The diameter of the fiber core is 5-100 um, and the diameter of the cladding is 120-800 um.

The active microcrystalline fiber passes the laser performance test and produces laser output with conversion efficiency of 30-80%.

A device of preparation active microcrystalline fiber, including wire drawing furnace, which is magnetic field generating device and laser generator are arranged in the outlet direction of wire drawing furnace.

The magnetic field generated by the magnetic field generator is stable magnetic field, alternating magnetic field or pulsed magnetic field.

Laser generator is fiber laser, gas laser or semiconductor laser.

Drawing furnace is graphite drawing furnace or laser drawing furnace.

The technical principles of the present invention is:

Appropriate laser processing power directly affects the silicate glass fiber in the crystal structure, type, degree of crystallinity, grain size, content, and how much residual phase of glass. Induced by external magnetic field, the thermodynamics and dynamics of crystallization process are changed, make the crystal size distribution is better and uniform, reduce the phenomenon of condensation and makes the grain size is smaller. When the grain size is less than ½₀ of the luminous wavelength, the scattering loss caused by the grain can be ignored, which is of great significance to fabricate the active microcrystalline fiber with better performance.

Effect of the Invention

Laser processing technology, laser action spot area is small, laser processing power and spot size can be adjusted, can accurately control the crystallization area.

Induced by magnetic field, grain growth can be controlled, and the magnetic field generating device is flexible, simple and convenient to operate, and the effect is obvious. The active microcrystalline fiber obtained by this method has the characteristics of high doping concentration, high luminescence efficiency, long fluorescence life, good beam quality and high conversion efficiency. It has a wide application prospect as the gain medium of fiber laser and amplifier.

DETAILED DESCRIPTION OF THE INVENTION

The specific embodiments of the invention are further described in combination with the attached drawings, but the scope of protection required is not limited to this.

Figure 1:
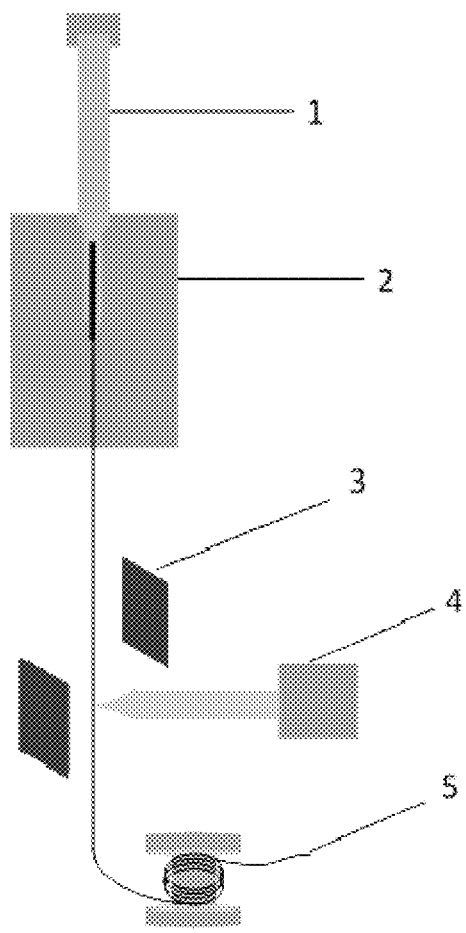
FIG. 1 is a schematic diagram of the preparation device of the invention. Including: 1—Prefabricated rod, 2—Wire drawing furnace, 3—Magnetic field generating device, 4—Laser generator, 5—Active microcrystalline fiber.

As shown in FIG. 1, a method and device for processing active microcrystalline fiber by magnetic field induction and lasering, the specific steps are: Place the prefabricated rod 1 in the drawing furnace 2 for wire drawing, the drawn fiber passes uncoated through the magnetic field generator 3 and laser generator 4, by introducing magnetic induction and laser processing, the laser beam is focused on the fiber and recrystallized after laser treatment to obtain active microcrystalline fiber 5.

Drawing furnace 2 is graphite drawing furnace or laser drawing furnace.

The magnetic field generated by the magnetic field generating device 3 is any of the stable magnetic field, alternating magnetic field and pulsed magnetic field, and the magnetic field intensity is 0-5 T.

The laser generator 4 uses fiber laser, gas laser, semiconductor laser in any one, laser processing power is 0-5 W.

The laser beam spot is ring or circular, and the diameter of the spot is 0.1-5 mm.

Figure 2:
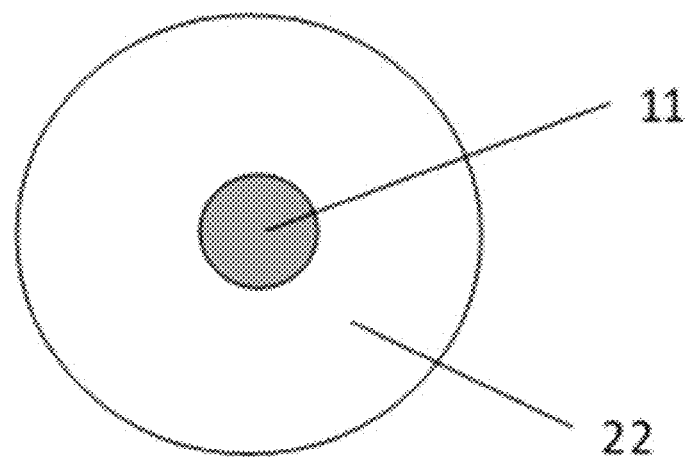
FIG. 2 is a schematic diagram of the cross-section structure of the active microcrystalline fiber of the invention.

As shown in FIG. 2, the cross-section structure of microcrystalline fiber includes fiber core 11 and cladding 22, and fiber core 11 is located at the center of cladding 22.

The diameter of the fiber core is 5-100 um, and the diameter of the cladding is 120-800 um.

The fiber core 11 is yttrium aluminum garnet, bismuth germanate, lead tungstate or sodium iodide. Active crystal precipitation, the crystal size is 2-100 nm, and the cladding 22 is quartz material.

The active crystals include ytterbium, neodymium, erbium, bismuth, thulium, holmium, cerium, terbium, gadolinium, single-doped or co-doped garnet crystals, bismuth germanate crystals, lead tungstate crystals, sodium iodide crystal materials, etc.

The active microcrystalline fiber passes the laser performance test and produces laser output with conversion efficiency of 30-80%.

Example 1

As shown in FIG. 1, a method for processing active microcrystalline fiber by magnetic field induction and lasering, the specific steps are: Yb:YAG crystals with a doping concentration of 10 at % were processed into micron rods, their surfaces were polished, and the rods were inserted into the cleaned and dried quartz sleeve to make prefabricated rods. The prefabricated rod is fixed on the laser drawing furnace by an aluminum fixture for wire drawing, in wire drawing; the doped fiber drawn is made to pass through an alternating magnetic field in an uncoated state. The two magnetic poles of the alternating magnetic field are vertically placed on both sides of the fiber, and the fiber coincide with the central axis of the two magnetic poles. The magnetic field intensity is 0.2 T, and the carbon dioxide laser is turned on at the same time, laser processing power is 1.5 W. The laser beam is focused and shaped into ring spots acting around the fiber, so that the fiber is heated evenly, and the diameter of the spot is 200 um. As shown in FIG. 2, the core diameter of active microcrystalline optical fiber is 15-20 um, the diameter of the cladding is 130-200 um, and fiber core is located at the center of cladding.

Figure 3:
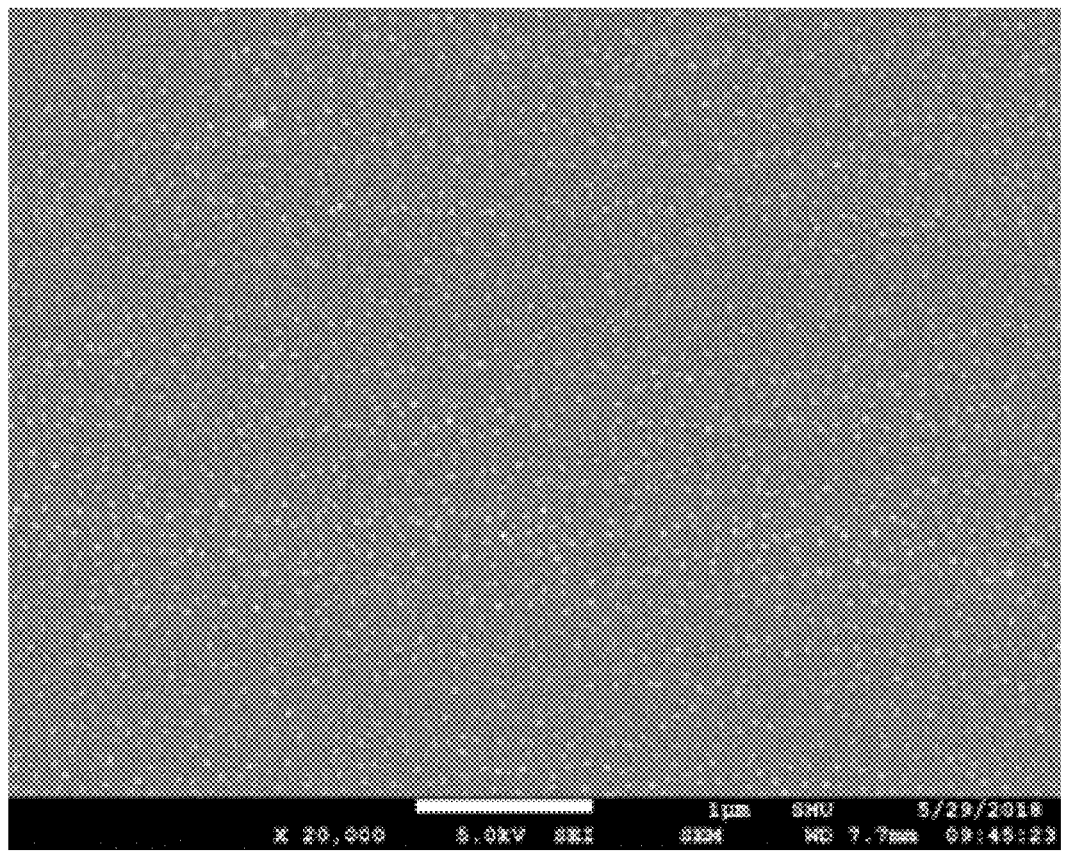
FIG. 3 is the scanning electron microscope diagram of the active microcrystalline optical fiber core of the invention.
Figure 4:
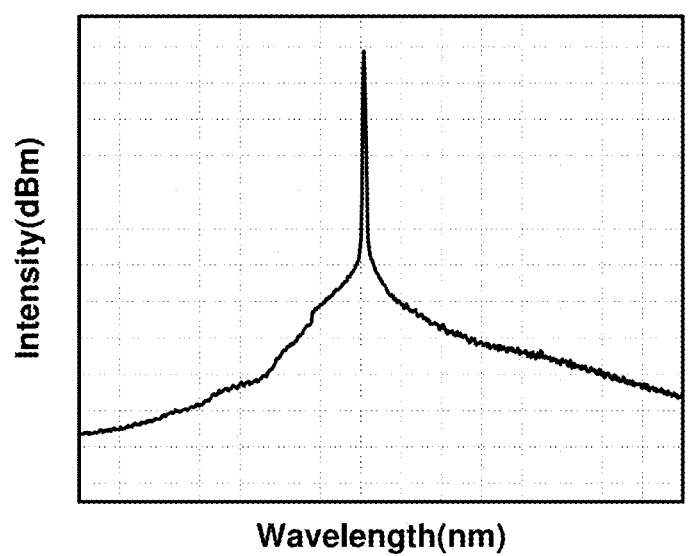
FIG. 4 is a schematic diagram of the laser output spectrum of the active microcrystalline fiber of the invention.

As shown in FIG. 3, the fiber core is yttrium aluminum silicate material. By scanning electron microscope to observe the fiber core, obviously observed crystal precipitation, the crystal size is 30-50 nm, and the crystal distribution is relatively uniform. As shown in FIG. 4, the active microcrystalline fiber passes the laser performance test and produces laser output with conversion efficiency over 30%.

Example 2

A method for processing active microcrystalline fiber by magnetic field induction and lasering, the specific steps are: Yb:YAG crystals with a doping concentration of 10 at % were processed into micron rods, their surfaces were polished, and the rods were inserted into the cleaned and dried quartz sleeve to make prefabricated rods. The prefabricated rod is fixed on the laser drawing furnace by an aluminum fixture for wire drawing, in wire drawing; the doped fiber drawn is made to pass through an alternating magnetic field in an uncoated state. The two magnetic poles of the alternating magnetic field are vertically placed on both sides of the fiber, and the fiber coincide with the central axis of the two magnetic poles. The magnetic field intensity is 0.1 T, and the carbon dioxide laser is turned on at the same time, laser processing power is 2 W. The laser beam is focused and shaped into ring spots acting around the fiber, so that the fiber is heated evenly, and the diameter of the spot is 200 um.

The core diameter of active microcrystalline optical fiber is 6-12 um, the diameter of the cladding is 120-150 um, and fiber core is located at the center of cladding.

The fiber core is yttrium aluminum silicate material. By scanning electron microscope to observe the fiber core, obviously observed crystal precipitation, the crystal size is 40-60 nm, and the crystal distribution is relatively uniform.

The active microcrystalline fiber passes the laser performance test and produces laser output with conversion efficiency over 30%.

Example 3

A method for processing active microcrystalline fiber by magnetic field induction and lasering, the specific steps are: Yb:YAG crystals with a doping concentration of 10 at % were processed into micron rods, their surfaces were polished, and the rods were inserted into the cleaned and dried quartz sleeve to make prefabricated rods. The prefabricated rod is fixed on the laser drawing furnace by an aluminum fixture for wire drawing, in wire drawing; the doped fiber drawn is made to pass through an alternating magnetic field in an uncoated state. The two magnetic poles of the alternating magnetic field are vertically placed on both sides of the fiber, and the fiber coincide with the central axis of the two magnetic poles. The magnetic field intensity is 0.5 T, and the carbon dioxide laser is turned on at the same time, laser processing power is 3 W. The laser beam is focused and shaped into ring spots acting around the fiber, so that the fiber is heated evenly, and the diameter of the spot is 500 um.

The core diameter of active microcrystalline optical fiber is 20-40 um, the diameter of the cladding is 200-400 um, and fiber core is located at the center of cladding.

The fiber core is yttrium aluminum silicate material. By scanning electron microscope to observe the fiber core, obviously observed crystal precipitation, the crystal size is 50-80 nm, and the crystal distribution is relatively uniform.

The active microcrystalline fiber passes the laser performance test and produces laser output with conversion efficiency over 30%.

Example 4

A method for processing active microcrystalline fiber by magnetic field induction and lasering, the specific steps are: Yb:YAG crystals with a doping concentration of 10 at % were processed into micron rods, their surfaces were polished, and the rods were inserted into the cleaned and dried quartz sleeve to make prefabricated rods. The prefabricated rod is fixed on the laser drawing furnace by an aluminum fixture for wire drawing, in wire drawing; the doped fiber drawn is made to pass through an alternating magnetic field in an uncoated state. The two magnetic poles of the alternating magnetic field are vertically placed on both sides of the fiber, and the fiber coincide with the central axis of the two magnetic poles. The magnetic field intensity is 3 T, and the carbon dioxide laser is turned on at the same time, laser processing power is 4 W. The laser beam is focused and shaped into ring spots acting around the fiber, so that the fiber is heated evenly, and the diameter of the spot is 600 um.

The core diameter of active microcrystalline optical fiber is 20-40 um, the diameter of the cladding is 200-400 um, and fiber core is located at the center of cladding.

The fiber core is yttrium aluminum silicate material. By scanning electron microscope to observe the fiber core, obviously observed crystal precipitation, the crystal size is 50-80 nm, and the crystal distribution is relatively uniform.

The active microcrystalline fiber passes the laser performance test and produces laser output with conversion efficiency over 30%.

Example 5

A method for processing active microcrystalline fiber by magnetic field induction and lasering, the specific steps are: Yb:YAG crystals with a doping concentration of 10 at % were processed into micron rods, their surfaces were polished, and the rods were inserted into the cleaned and dried quartz sleeve to make prefabricated rods. The prefabricated rod is fixed on the laser drawing furnace by an aluminum fixture for wire drawing, in wire drawing; the doped fiber drawn is made to pass through an alternating magnetic field in an uncoated state. The two magnetic poles of the alternating magnetic field are vertically placed on both sides of the fiber, and the fiber coincide with the central axis of the two magnetic poles. The magnetic field intensity is 0.1 T, and the carbon dioxide laser is turned on at the same time, laser processing power is 0.3 W. The laser beam is focused and shaped into ring spots acting around the fiber, so that the fiber is heated evenly, and the diameter of the spot is 150 um.

The core diameter of active microcrystalline optical fiber is 6-12 um, the diameter of the cladding is 120-150 um, and fiber core is located at the center of cladding.

The fiber core is yttrium aluminum silicate material. By scanning electron microscope to observe the fiber core, obviously observed crystal precipitation, the crystal size is 40-60 nm, and the crystal distribution is relatively uniform.

The active microcrystalline fiber passes the laser performance test and produces laser output with conversion efficiency over 30%.

What is claimed is:

1. A method of preparation of an active optical fiber, comprising: processing Yb:YAG crystals with a doping concentration of 10 at % into rods;
   polishing surfaces of the rods;
   inserting the rods into a clean and dried quartz sleeve to make a prefabricated rod;
   fixing the prefabricated rod on a laser drawing furnace with an aluminum fixture for wire drawings, thus yielding a drawn fiber;
   introducing the drawn fiber to pass through a magnetic field in an uncoated state, wherein two magnetic poles of the magnetic field are vertically placed on both sides of the drawn fiber, and the drawn fiber coincides with the central axis of the two magnetic poles;
   turning on a carbon dioxide laser at the same time as the step of introducing the drawn fiber; and
   focusing a laser beam of the carbon dioxide laser on the drawn fiber such that the drawn fiber is recrystallized to obtain the active optical fiber comprising a fiber core with a diameter ranging from 5-100 μm and a cladding layer with a diameter ranging from 120-800 μm, wherein the laser beam is focused and shaped into spots acting around the drawn fiber so that the drawn fiber is heated evenly and the fiber core is at the center of the cladding.

2. The method of preparation of an active optical fiber according to claim 1, wherein the magnetic field is an alternating magnetic field.

3. The method of preparation of an active optical fiber according to claim 2, wherein a strength of the magnetic field is greater than OT and up to 5 T.

4. The method of preparation of an active optical fiber according to claim 3, wherein the laser has a power greater than OW and up to 5 W.

5. The method of preparation of an active optical fiber according to claim 4, wherein a laser beam spot is a ring or circular, and a diameter of the laser beam spot is 0.1-5 mm.

6. The method of preparation of an active optical fiber according to claim 4, wherein the magnetic field has an intensity of 0.2 T; the carbon dioxide laser has a laser processing power of 1.5 W; the laser beam has a spot diameter of 200 μm; the active optical fiber has a core diameter ranging from 15-20 μm and a diameter of the cladding ranging from 130-200 μm; and the core has a crystal size ranging from 30-50 nm.

7. The method of preparation of an active optical fiber according to claim 4, wherein the magnetic field has an intensity of 0.1 T, the carbon dioxide laser has a laser processing power of 2 W; the laser beam has a spot diameter of 200 μm; the active optical fiber has a core diameter ranging from 6-12 μm and a diameter of the cladding ranging from 120-150 μm; and the core has a crystal size ranging from 40-60 nm.

8. The method of preparation of an active optical fiber according to claim 4, wherein the magnetic field has an intensity of 0.5 T, the carbon dioxide laser has a laser processing power of 3 W; the laser beam has a spot diameter of 500 μm; the active optical fiber has a core diameter ranging from 20-40 μm and a diameter of the cladding ranging from 200-400 μm; and the core has a crystal size ranging from 50-80 nm.

9. The method of preparation of an active optical fiber according to claim 4, wherein the magnetic field has an intensity of 3 T, the carbon dioxide laser has a laser processing power of 4 W; the laser beam has a spot diameter of 600 μm; the active optical fiber has a core diameter ranging from 20-40 μm and a diameter of the cladding ranging from 200-400 μm; and the core has a crystal size ranging from 50-80 nm.

10. The method of preparation of an active optical fiber according to claim 4, wherein the magnetic field has an intensity of 0.1 T, the carbon dioxide laser has a laser processing power of 0.3 W; the laser beam has a spot diameter of 150 μm; the active optical fiber has a core diameter ranging from 6-12 μm and a diameter of the cladding ranging from 120-150 μm, and the core has a crystal size ranging from 40-60 nm.

* * * * *